(12) United States Patent
Luo et al.

(10) Patent No.: US 6,732,107 B1
(45) Date of Patent: May 4, 2004

(54) SPATIAL JOIN METHOD AND APPARATUS

(75) Inventors: Gang Luo, Madison, WI (US); Curt J. Ellmann, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 391 days.

(21) Appl. No.: 09/817,566

(22) Filed: Mar. 26, 2001

(51) Int. Cl.$^7$ ................................................. G06F 7/00
(52) U.S. Cl. ........................ 707/100; 707/1; 707/104.1; 707/102
(58) Field of Search ................ 707/1, 3, 4, 2, 707/6, 102, 5, 100, 104.1

(56) References Cited

U.S. PATENT DOCUMENTS

| | | | | |
|---|---|---|---|---|
| 5,701,467 A | * | 12/1997 | Freeston | 707/100 |
| 5,761,652 A | * | 6/1998 | Wu et al. | 707/2 |
| 5,884,320 A | * | 3/1999 | Agrawal et al. | 707/104.1 |
| 5,963,956 A | * | 10/1999 | Smartt | 707/104.1 |
| 6,003,036 A | * | 12/1999 | Martin | 707/102 |
| 6,014,614 A | * | 1/2000 | Herring et al. | 702/196 |
| 6,092,061 A | * | 7/2000 | Choy | 707/1 |
| 6,148,295 A | * | 11/2000 | Megiddo et al. | 707/3 |
| 6,185,557 B1 | * | 2/2001 | Liu | 707/4 |
| 6,282,570 B1 | * | 8/2001 | Leung et al. | 709/224 |
| 6,353,832 B1 | * | 3/2002 | Acharya et al. | 707/104.1 |
| 6,446,060 B1 | * | 9/2002 | Bergman et al. | 707/3 |
| 6,449,606 B1 | * | 9/2002 | Witkowski | 707/3 |

OTHER PUBLICATIONS

A. Aiken et al., "The Tioga-2 Database Visualization Environment", ICDE 1996, pp. 208–217.

N. Beckmann et al., "The R*-tree: An Efficient and Robust Access Method for Points and Rectangles", SIGMOD Conf. 1990, pp.. 322–331.

T. Brinkhoff et al., "Parallel Processing of Spatial Joins Using R-Trees", ICDE 1996, pp. 258–265.

T. Brinkhoff et al., "Efficient Processing of Spatial Joins Using R-trees", SIGMOD Conf. 1993, pp. 237–246.

M. Carey et al., "The BUCKY Objection-Relational Benchmark", SIGMOD Conf. 1997, pp. 135–146.

D. DeWitt et al., "Client-Server Paradise", VLDB 1994, pp. 558–569.

V. Gaede et al., "Multidimensional Access Methods", Computing Surveys 30(2), 1998, pp. 170–231.

G. Graefe, "Query Evaluation Techniques for Large Databases", ACM Comput. Surveys, 25(2):73–170, Jun. 1993.

A. Guttman, "R-Trees: A Dynamic Index Structure for Spatial Searching", SIGMOD Conf. 1984, pp. 47–57.

P. Haas et al., "Join Algorithms for Online Aggregation", IBM Research Report RJ10126, 1998.

(List continued on next page.)

Primary Examiner—Greta Robinson
Assistant Examiner—Miranda Le
(74) Attorney, Agent, or Firm—Trop, Pruner & Hu, P.C.

(57) ABSTRACT

A non-blocking parallel spatial join algorithm generates the spatial join result tuples continuously even in the event of memory overflow. The algorithm employs duplicate avoidance techniques to avoid the blocking and time-consuming removal of duplicates. The algorithm also uses parallelism to improve performance.

37 Claims, 13 Drawing Sheets

OTHER PUBLICATIONS

P. Haas, "Techniques for Online Exploration of Large Object– Relational Dataeets", Proc. 11$^{th}$ Intl. Conf. Scientific and Statistical Database Management, 1999, pp. 4–12.

J. Hellerstein et al., "Interactive Data Analysis: The Control Project", IEEE Computer, 32, Aug. 1999, pp. 51–59.

J. Hellerstein et al., "Informix under CONTROL: Online Query Processing", Data Mining and Knowledge Discovery, 2000.

J. Hellerstein, "Online Processing Redux", IEEE Data Engineering Bulletin, Sep. 1997.

J. Hellerstein, "Looking Forward to Interactive Queries", Database Programming and Design, Aug. 1998.

J. Hellerstein et al., "Adaptive Query Processing: Technology in Evolution", IEEE Data Engineering Bulletin, Jun. 2000.

P. Haas et al., "Ripple Joins for Online Aggregation", SIGMOD Conf. 1999, pp. 287–298.

J. Hellerstein et al., "Online Aggregation", SIGMOD Conf. 1997, pp. 171–182.

Z. Ives et al., "An Adaptive Query Execution System for Data Integration", SIGMOD Conf. 1999, pp. 299–310.

I. Kamel et al., "Parallel R–trees", SIGMOD Conf. 1992, pp. 195–204.

M. Lo et al., "Spatial Joins Using Seeded Trees", SIGMOD Conf. 1994, pp. 209–220.

M. Lo et al., "Spatial Hash–Joins", SIGMOD Conf. 1996.

M. Livny et al., "DEVise: Integrated Querying and Visual Exploration of Large Datasets", SIGMOD Conf. 1997, pp. 301–312.

F. Olken, "Random Sampling from Databases", Ph.D. Dissertation, UC Berkeley, Apr. 1993, available as Tech. Report LBL–32883, Lawrence Berkeley Laboratories.

H. Pang et al., "Partially Preemptible Hash Joins", SIGMOD Conf. 1993, pp. 59–68.

H. Pang et al., "Memory–Adaptive External Sorting", VLDB 1993, pp. 618–629.

J. Patel et al., "Building a Scalable Geo–Spatial DBMS: Technology, Implementation, and Evaluation", SIGMOD Conf. 1997, pp. 336–347.

J. Patel et al., "Clone Join and Shadow Join: Two Parallel Algorithms for Executing Spatial Join Operations", Technical Report, University of Wisconsin, CS–TR–99–1403, Aug. 1999.

J. Patel et al., "Partition Based Spatial–Merge Join", SIGMOD Conf. 1996, pp. 259–270.

M. Stonebraker et al., "The Sequoia 2000 Storage Benchmark", SIGMOD Conf. 1993, pp. 632–645.

J. Shanmugasundaram et al., "Relational Databases for Querying XML Documents: Limitations and Opportunities", VLDB 1999, 302–314.

K. Tan et al., "Online Feedback for Nested Aggregate Queries with Multi–Threading", VLDB 1999, pp. 18–29.

T. Urhan et al., "XJoin: Getting Fast Answers from Slow and Bursty Networks", Technical Report, CS–TR–3994, UMI-ACS–TR–99–13, Feb. 1999, pp. 1–21.

* cited by examiner

Figure 7
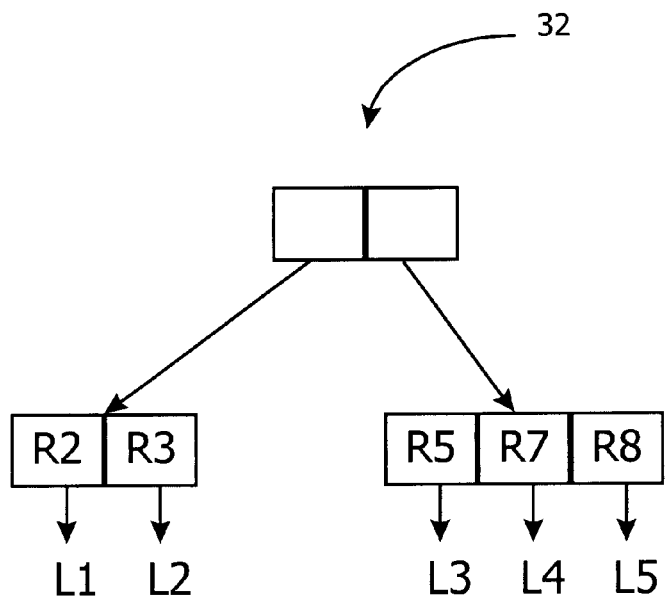
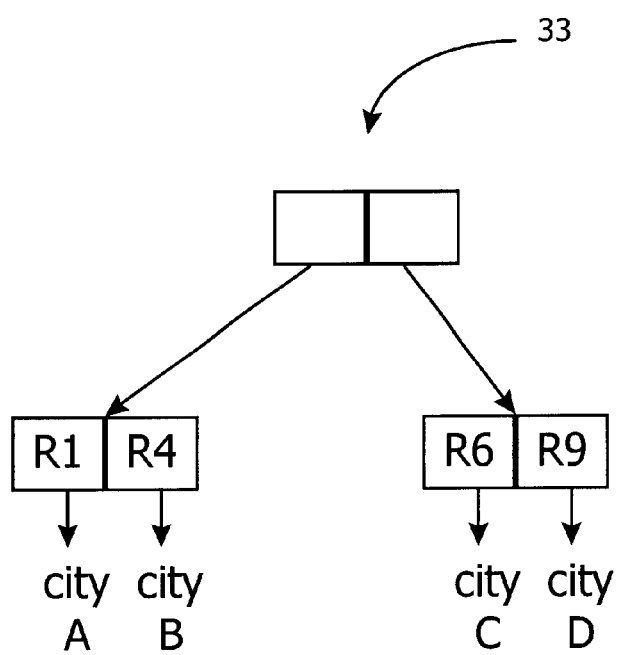

Figure 10
first stage

Figure 11A
second stage
Figure 11B
second stage
    for each partition that overlaps with the MBR of the spatial join attribute value of the tuple:
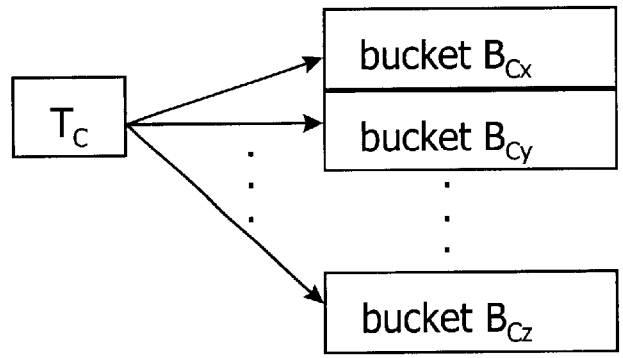
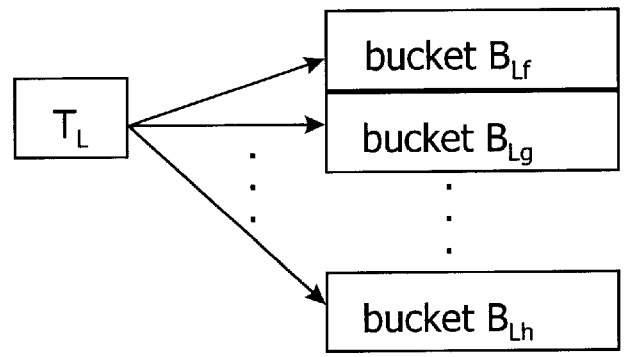

third stage

Figure 13

|       | 0 | 1 | 2 | 3 | 4 | 5 | 6 | 7 | 8 | 9 | 10 | 11 | 12 | 13 | 14 | 15 |
|-------|---|---|---|---|---|---|---|---|---|---|----|----|----|----|----|----|
| $BM_C$ | 0 | 0 | 1 | 1 | 0 | 1 | 0 | 1 | 0 | 1 | 1  | 0  | 0  | 1  | 1  | 0  |

|       | 0 | 1 | 2 | 3 | 4 | 5 | 6 | 7 | 8 | 9 | 10 | 11 | 12 | 13 | 14 | 15 |
|-------|---|---|---|---|---|---|---|---|---|---|----|----|----|----|----|----|
| $BM_L$ | 0 | 1 | 0 | 1 | 0 | 1 | 0 | 1 | 0 | 1 | 0  | 1  | 1  | 1  | 0  | 1  |

|         | 0 | 1 | 2 | 3 | 4 | 5 | 6 | 7 | 8 | 9 | 10 | 11 | 12 | 13 | 14 | 15 |
|---------|---|---|---|---|---|---|---|---|---|---|----|----|----|----|----|----|
| $BM_{CL}$ | 0 | 0 | 0 | 1 | 0 | 1 | 0 | 1 | 0 | 1 | 0  | 0  | 0  | 1  | 0  | 0  |

SPATIAL JOIN METHOD AND APPARATUS

BACKGROUND

Relational databases are used for storage and retrieval of information. The information is structured in the database as two-dimensional tables of rows and columns. A column heading designates the type of data stored in each column. The information is stored in a non-volatile medium such as a disk array.

Users may access the database information typically by using database management software. The database storage media and management software together comprise a database management system, or DBMS. DBMSs may be implemented on a centralized mainframe system, or may be distributed in a client-server network, as examples.

The database management software includes specialized commands for accessing the database information. For example, a common command for accessing data is a Structured Query Language (SQL) "select" query. Using the select query, one or more rows from one or more tables of the database may be retrieved.

The database data typically includes numbers and strings. An employee phone list, for example, may be included in a database system. More recently, spatial data, such as images, are stored along with the more traditional data. Spatial data is typically more unwieldy to manage in a database than are numbers and strings.

Traditionally, DBMSs processed queries in batch mode. In other words, a user wanting to extract information from the database would submit a query, wait a long time during which no feedback is provided, and then receive a precise answer.

One alternative to batch query processing is known as adaptive query processing. Adaptive query processing involves an iterative feedback process in which the DBMS receives information from its environment and uses the information to adapt the behavior of the query. Rather than receiving a precise answer after a long wait, an approximate answer may be received almost immediately upon submitting a query.

Database queries often invoke join operations to produce query results. Upon receiving the multi-table query, tuples, or rows, from one table are joined with tuples from a second table, to produce a result. When the tuples contain spatial data, the join operation may be prohibitively slow, in some environments.

SUMMARY

In accordance with the embodiments described herein, a method is disclosed in which first tuples are stored in a first table and second tuples are stored in a second table in a system, the first and second tuples are partitioned into plural portions and joined based on the partitioned portions.

Other features and embodiments will become apparent from the following description, from the drawings, and from the claims.

BRIEF DESCRIPTION OF THE DRAWINGS

FIG. 7 is a diagram of two spatial indices of the MBRs of FIG. 6 according to an example;

FIG. 10 is a diagram illustrating a first stage of the spatial join operation according to one embodiment of the invention;

FIGS. 11A and 11B are diagrams illustrating a second stage of the spatial join operation according to one embodiment of the invention;

FIG. 13 is a diagram of bitmaps used to select a node from plural nodes for performing a spatial join operation according to one embodiment of the invention.

DETAILED DESCRIPTION

Figure 1:
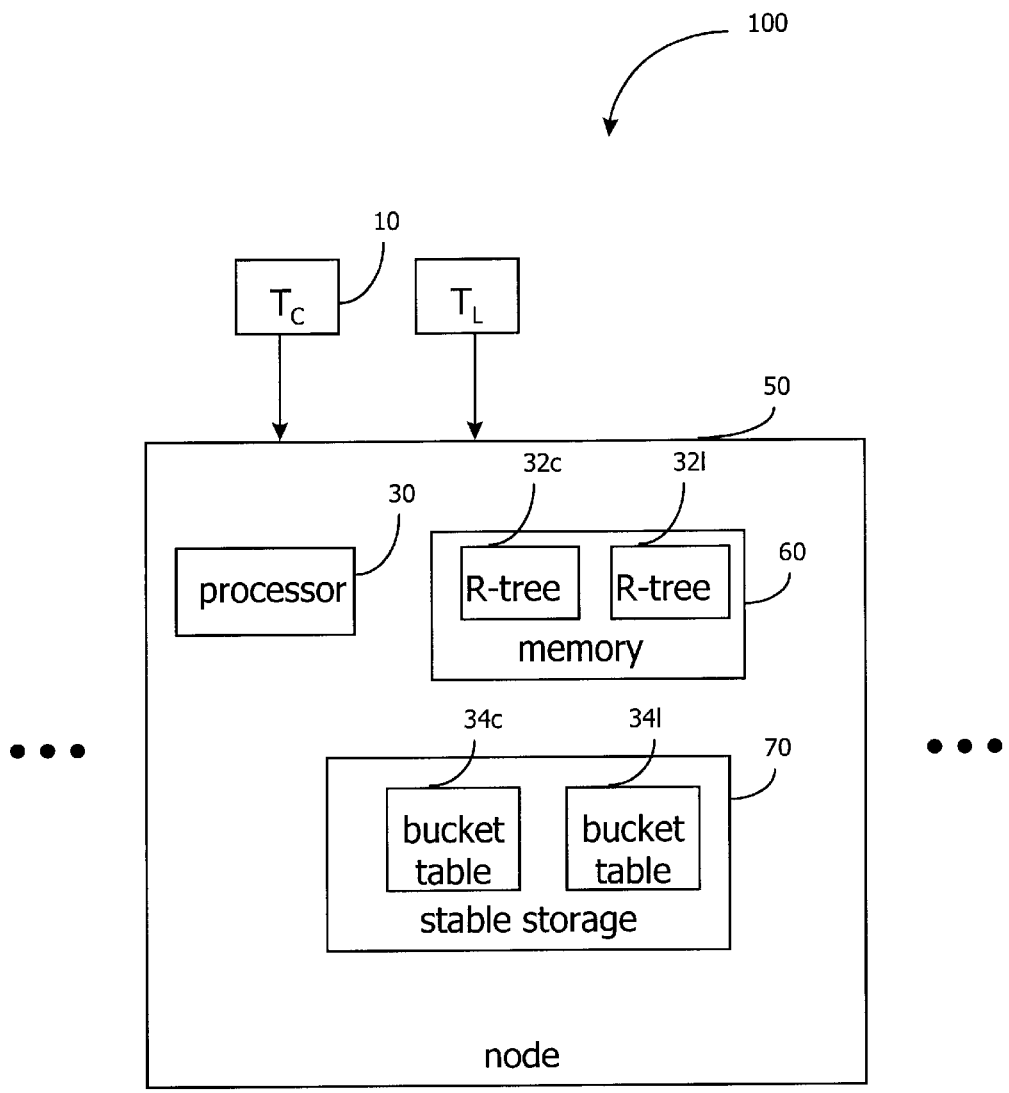
FIG. 1 is a block diagram of a system according to one embodiment of the invention.

In the following description, numerous details are set forth to provide an understanding of the present invention. However, it will be understood by those skilled in the art that the present invention may be practiced without these details and that numerous variations or modifications from the described embodiments may be possible.

Adaptive query processing is distinguishable from traditional batch processing in that intermediate results are quickly displayed and continuously updated to the user. Where batch processing produces a final answer, usually after a long wait, adaptive query processing produces intermediate results based on a sampling of the database. Ideally, the intermediate results proceed toward the final answer, with each iteration, thus, giving the user a "sense" of the query result, without having to wait for the final result.

Obtaining intermediate results that proceed toward the final answer occurs when the samples are retrieved from the database at random. Random samples tend to produce more and more precise answers as more tuples are processed.

Another consideration for adaptive query processing is resource-related. Many queries utilize join operations, in which tuples from a first table are joined with tuples from a second table. In one arrangement, a tuple is a row of the table. In other arrangements, a tuple can refer to other portions of the table. A typical join operation may involve retrieving thousands or even millions of tuples. Each tuple is stored in a stable, non-volatile location, such as a disk drive. The tuple is typically retrieved to a volatile location, such as a memory, during query processing. The available memory may limit the number of tuples loaded at a time.

A join operation involves comparisons between tuples of two different tables. Whether the join is an equijoin or a spatial join, each tuple of each table is potentially compared to each tuple of the other table. Once a tuple from a first table is retrieved to memory, a join operation may be processed between the tuple and all tuples from a second table.

If the tuple is to be processed in its entirety, both the first tuple and all tuples from the second table are in memory. If fewer tuples are actually loaded in memory, the tuple may be retrieved a second time from disk. Join processing thus involves tradeoffs between available memory and the amount of disk access that occurs.

A spatial database includes a collection of tuples representing spatial objects. Each tuple includes some spatial attribute that represents spatial objects. Tuples representing spatial objects may be joined, just like other tuples. The tuples may be joined, for example, based upon some spatial condition, such as overlapping of the spatial object attributes.

Spatial join operations are typically blocking. That is, results are not displayed until all the data has been processed. Non-blocking spatial join processing has not been used due to an inherent property of spatial data. When the tables are partitioned to perform the spatial join operation, the tuples representing spatial data objects are replicated at multiple partitions. This produces duplicate join result tuples, which may compromise the accuracy of intermediate results.

In accordance with the several embodiments described herein, a system 100, as depicted in FIG. 1, performs non-blocking spatial join operations. Further, in the arrangement, the non-blocking spatial join operations are performed in a parallel DBMS environment. During the spatial join operations, spatial join result tuples are generated continuously, even in the event of memory overflow. Further, the system 100 employs duplicate avoidance techniques rather than performing duplicate removals, thus producing valid intermediate results. Additionally, the system 100 uses parallelism to improve performance.

The system 100 includes one or more nodes 50, which may operate in parallel during a spatial join operation. According to one embodiment, each node 50 includes a processor 30 that may execute software for performing spatial join operations. The node 50 further includes memory 60 (also referred to as non-persistent or volatile storage) and stable storage 70, for temporary and permanent storage, respectively, of tuples 10 received by the node 50.

In one embodiment, the database software in each node 50 defines data structures for managing the tuples 10. In FIG. 1, these data structures are shown as R-trees 32 and bucket tables 34. Before discussing these data structures as well as the implementation details in general, a general discussion of spatial join operations follows.

Suppose a person is called to investigate the availability of water resources in certain cities. The person has access to a database that includes two tables, "lakes" and "cities," with some spatial attributes indicating their locations. To determine all the lakes that overlap with a city, a spatial join operation may be performed on the database.

Figure 2:
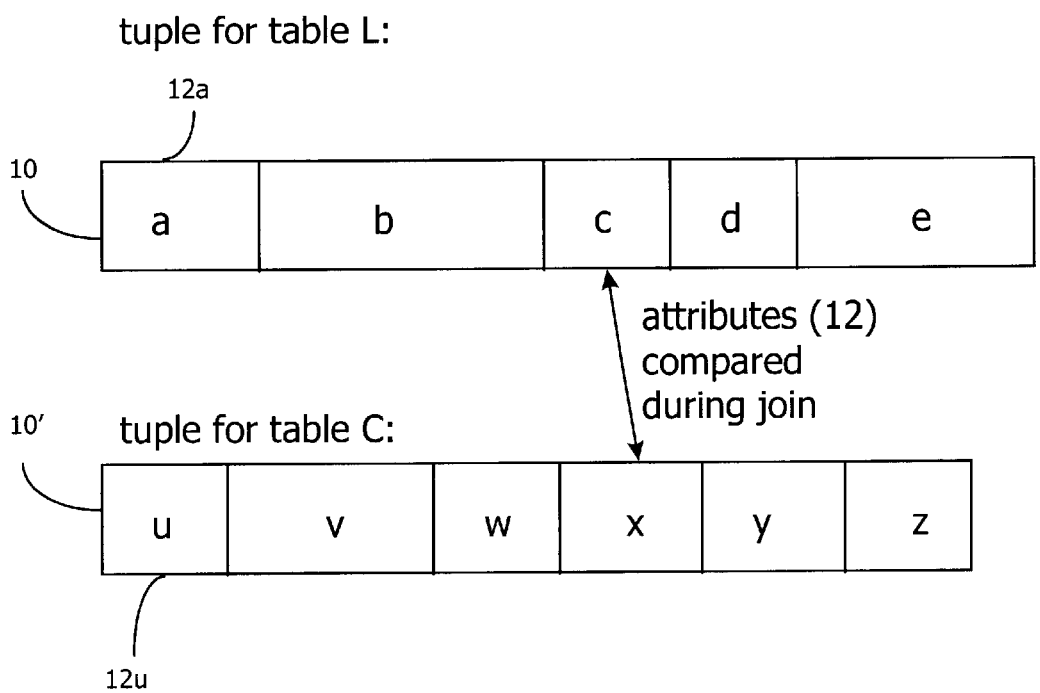
FIG. 2 is a block diagram of join tuples with attributes according to an example.

To perform the spatial join operation, a table L (for "lakes") may be identified comprising tuples $T_L$ 10. Likewise, a table C (for "cities") comprising tuples $T_C$ 10 may be identified. For example, the tuples 10 for table L and table C are illustrated in FIG. 2. The tuple 10 for table L ($T_L$) includes attributes 12, denoted a, b, c, d, and e. The tuple 10' for table C ($T_C$) includes attributes 12, denoted u, v, w, x, y, and z. In this example join operation, the attribute c of tuple 10 is a spatial attribute. Likewise, the attribute x of tuple 10' is a spatial attribute. Accordingly, when performing a spatial join operation, attributes c and x are compared, as illustrated by the double-sided arrow.

Figure 3:
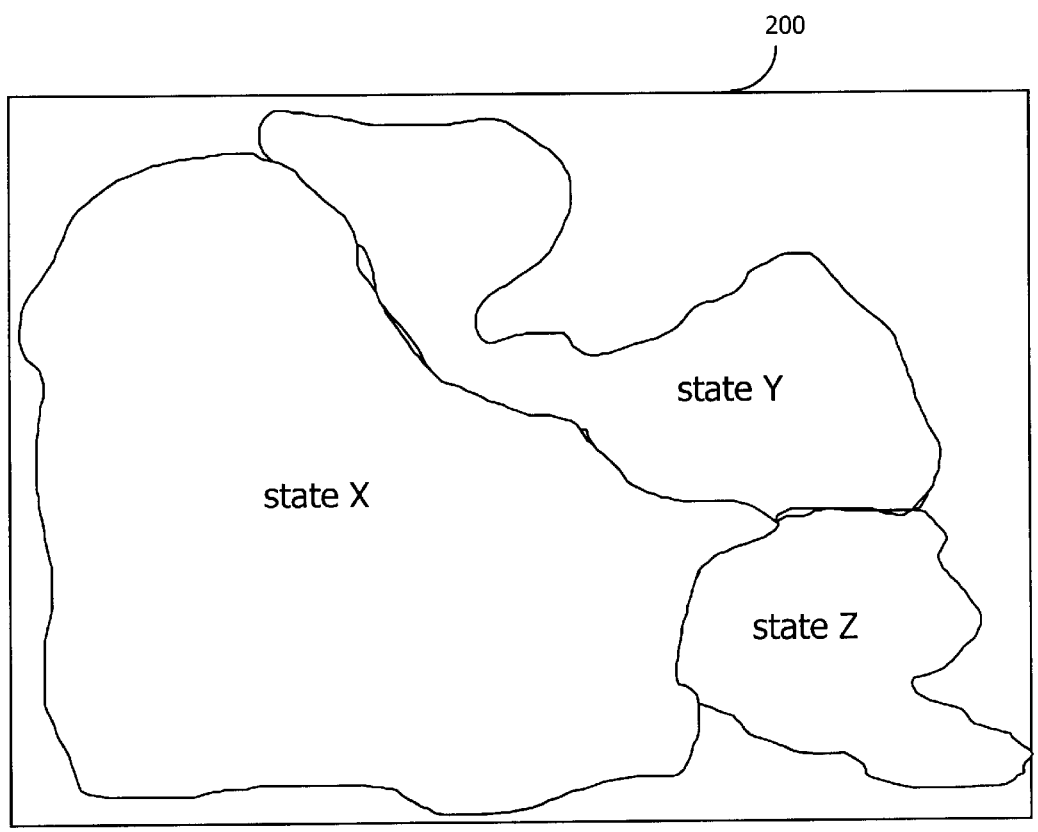
FIG. 3 is a diagram of a hypothetical universe including hypothetical states according to an example.

In FIG. 3, a hypothetical universe 200 includes three states, X, Y, and Z. Each state may include cities and lakes (not shown) upon which a spatial join operation may be performed. The universe 200 includes all spatial attributes 12 associated with tuples 10 of the two tables being joined, in this case, table L and table C. If the universe 200 includes a large number of lakes and cities, the work of the spatial join may be divided, or partitioned, such that portions of the spatial join operation may be performed in parallel by distinct nodes 50.

Figure 4:
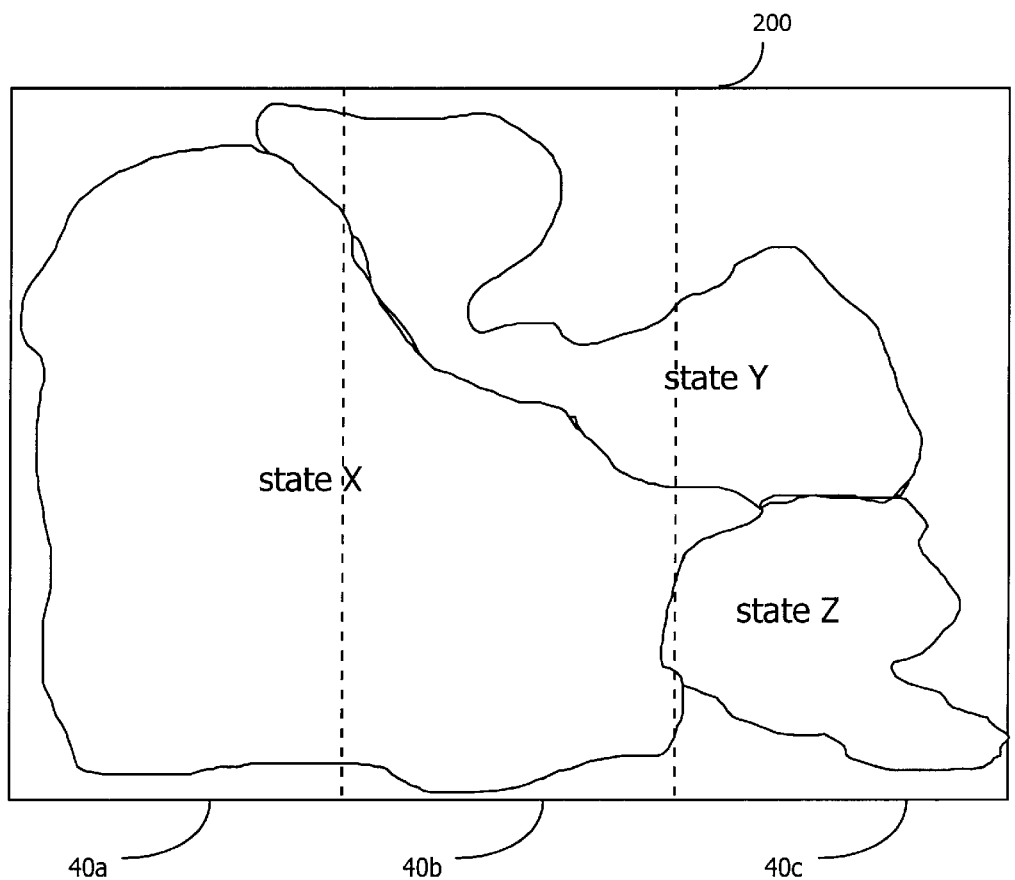
FIG. 4 is a diagram of the hypothetical universe of FIG. 3 partitioned into equally sized portions according to an example.

The universe 200 may be partitioned in a number of ways. For example, the universe 200 may be divided into equally sized partitions. In FIG. 4, for example, the universe 200 is divided into three partitions 40a, 40b, and 40c. The work of each partition 40 may be performed by a separate node 50, according to one embodiment. In the example of FIG. 4, three nodes 50 may perform the spatial join operation in parallel according to its partitioning strategy.

If the concentration of lakes and cities is skewed, however, dividing the universe 200 into equally sized partitions may allocate work unevenly to the three nodes. Thus, the universe 200 may instead be partitioned according to workload. In a second embodiment, the universe 200 is sampled to evenly distribute the workload among the available nodes.

Another strategy may be to assign a node to each state. A first node 50, for example, may operate on "lakes" and "cities" tuples 10 associated with state X. A second node 50 may perform spatial join operations for tuples 10 associated with state Y. The spatial join operations for state Z may be performed by a third node 50.

Figure 5A:
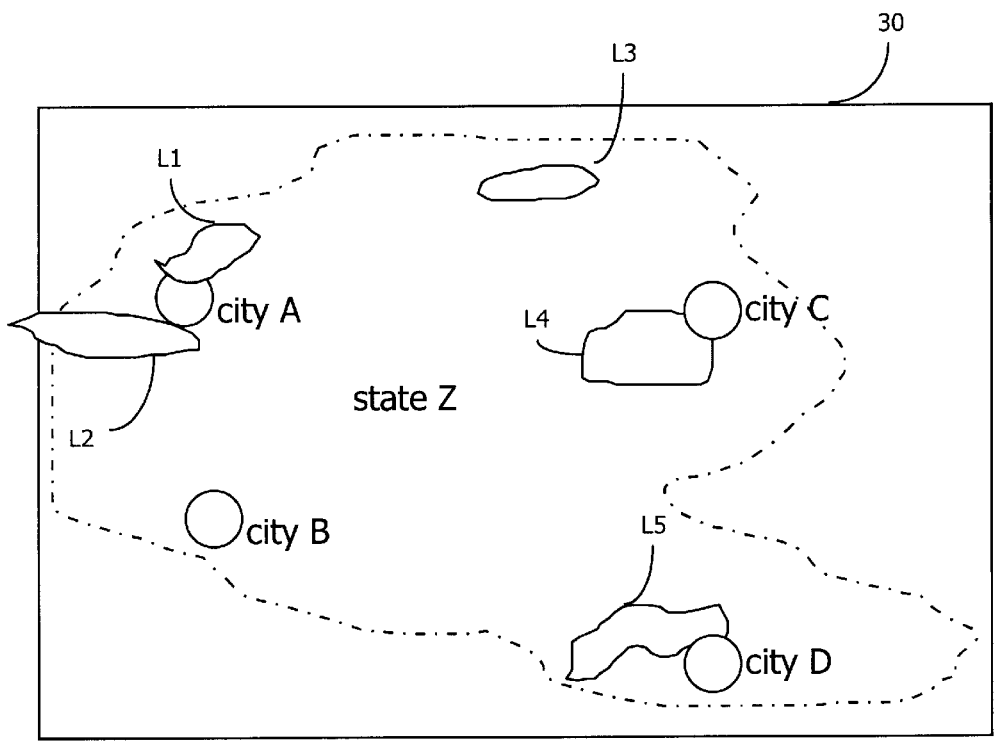
FIG. 5A is a block diagram of spatial attribute values of a partition according to an example.

Suppose the universe 200 is so partitioned, such that partition 30 includes only state Z, as depicted in FIG. 5A. State Z includes four cities, City A, City B, City C, and City D, as well as five lakes, L1, L2, L3, L4, and L5. To determine the available water resources in each city, a spatial join operation may be performed.

Figure 5B:
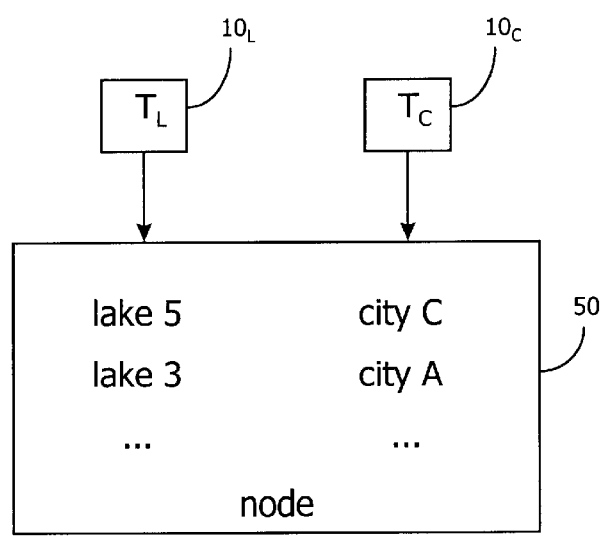
FIG. 5B is a block diagram showing redistribution of tuples to a node according to one embodiment of the invention.

Suppose a node 50 is to receive tuples 10 according to the state-by-state partitioning strategy, such that a spatial join operation may be performed. As depicted in FIG. 5B, the node 50 receives all lake tuples, $T_L$, associated with the state Z, and all city tuples, $T_C$, associated with the state Z. In some instances, tuples may belong to more than one state, and, thus, to more than one partition 30. For example, in FIG. 5A, lake L2 extends beyond the border of state Z. Thus, in one embodiment, the tuple 10 for lake L2 is sent to one node 50 for processing join operations for state Z while a second node 50, which processes join attribute values for state X, receives the tuple 10 as well.

In this simple example, with a small number of tuples, the water resources for city A may be determined by checking which of the five lakes, L1, L2, L3, L4, and L5, overlap with city A. Such operations may likewise be performed for the other cities in state Z.

In a real-life database query, the number of data items to be joined may be large. Thus, at each node, the partition 30 may be further sub-divided, or partitioned, according to a second partitioning strategy in one embodiment.

Figure 6:
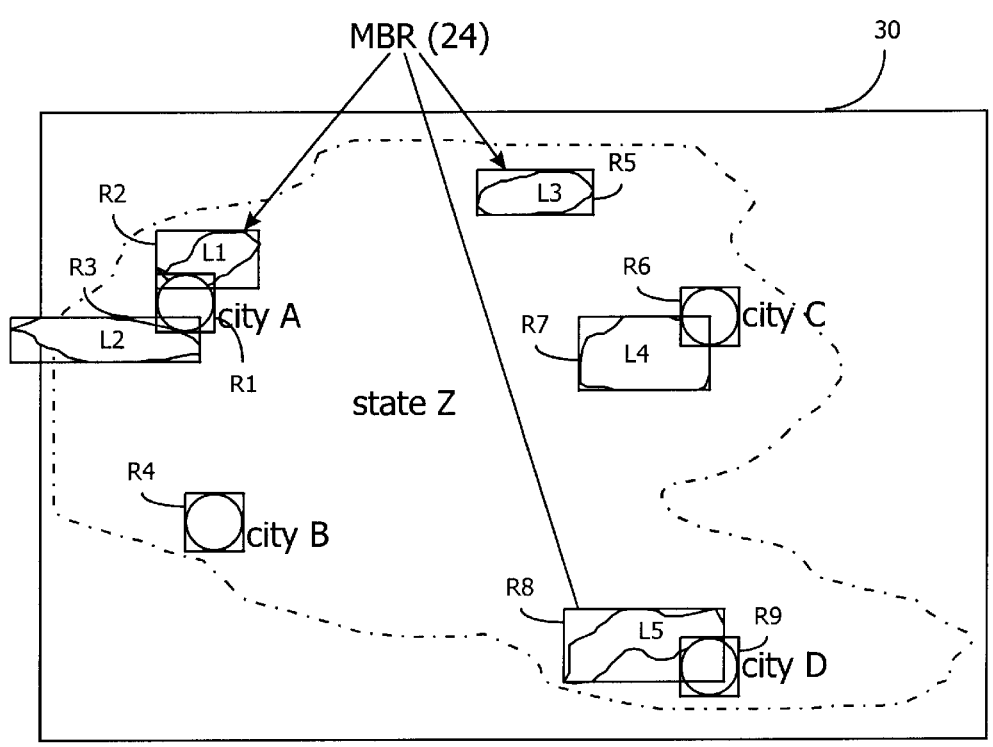
FIG. 6 is a block diagram of minimum bounding rectangles (MBRS) according to an example.

In one embodiment, each spatial attribute 12 has minimum bounding rectangle (MBR) 24. In FIG. 6, for example, an MBR 24 surrounds each lake L1 through L5. Likewise, an MBR 24 surrounds each city A through D. Each MBR 24 is assigned a distinct "R" value.

In one embodiment, two in-memory R-trees 32 are maintained at each node 50, as shown in FIG. 1. An R-tree is a data structure used to index spatial objects. As a spatial index, the R-tree may include the spatial data objects directly or may include pointers to the spatial data objects.

So, for example, an R-tree 32, $RT_L$, is maintained for the table L and R-tree 32, $RT_C$, is maintained for the table C. Each R-tree 32, $RT_C$ and $RT_L$, receive tuples $T_C$ and $T_L$, respectively, as they are received into the node 50. The R-trees 32 and 33 of FIG. 7 correspond to the spatial objects of FIG. 6.

Non-Blocking Parallel Spatial Join

Figure 8:
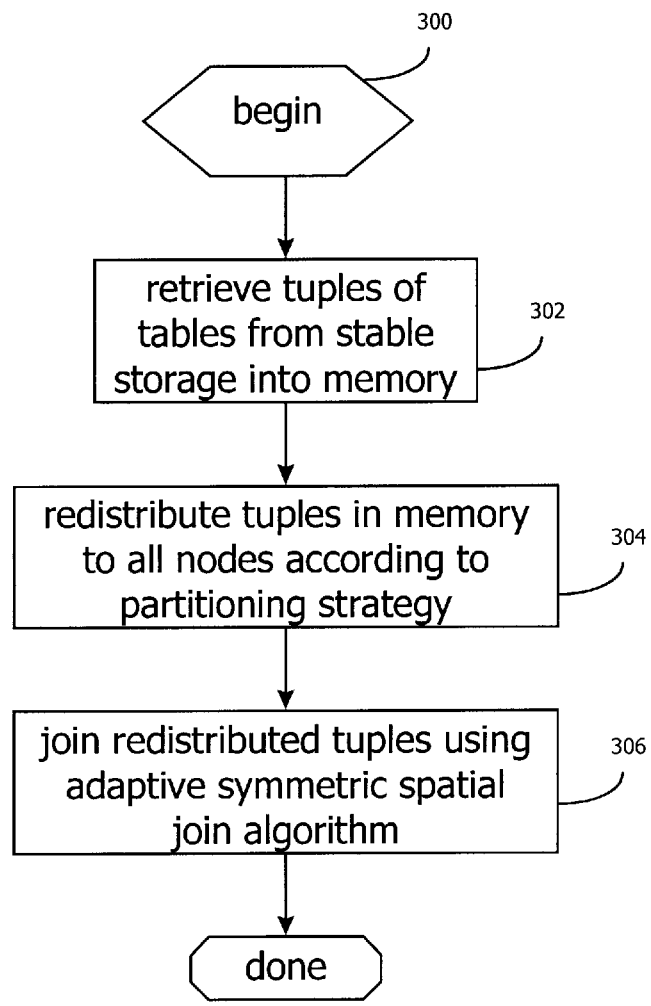
FIG. 8 is a flow diagram illustrating operation of the system of FIG. 1 in performing spatial join operations according to one embodiment of the invention.

Once the universe 200 is partitioned, a non-blocking parallel spatial join method and apparatus simultaneously performs operations on each node 10 using multithreading. These operations are depicted in FIG. 8, according to one embodiment.

For each table L, C that includes tuples 12 in its node 10, the tuples are received from stable storage 70 into the memory 60 (block 302). Then, as described above, the tuples 12 are redistributed to all the nodes 10 that are part of the system 100 (block 304), according to how the universe 200 is partitioned. In one embodiment, the tuples 12 are distributed evenly across all nodes 10 of the system 100.

Once redistributed, the tuples 12 are joined using the adaptive symmetric spatial join algorithm, as described below (block 306). The operations of FIG. 8 are independently and simultaneously performed for both table C and table L. When the tuples 12 of table C and table L are redistributed according to how the universe 200 is partitioned, a spatial join method and apparatus according to some embodiments may be implemented.

Bucket Tables

According to the redistribution strategy described above, each node 10 receives tuples 12 from each of tables C and L, one after another. Since the tuples 12 are used for the join operation, the join operation may be performed as the tuples 12 arrive at the node.

In one embodiment, each of the nodes 50 also maintains two bucket tables 34 in stable or persistent storage, as shown in FIG. 1. So, bucket table 34, $BT_L$, is maintained for the table L and bucket table 34, $BT_C$, is maintained for the table C. Bucket tables 34, $BT_C$ and $BT_L$, are further illustrated in FIG. 9, according to one embodiment.

Each bucket table 34 contains N buckets. Recall that each node 50 maintains one of the partitions 30 of the universe 200. According to one embodiment, a second spatial partitioning function further subdivides the partition of the universe at the node into N subdivisions. Each bucket $B_C$ of $BT_C$ ($B_L$ of $BT_L$) corresponds to a subdivision. In this way, as the tuples $T_C$ and $T_L$ are received into the node 50 and memory overflows, they can be inserted into the buckets.

Bucket table 34, $BT_C$, includes N buckets, $B_{C1} \ldots B_{CN}$. These buckets 22 are to receive tuples $T_C$ of table C. Likewise, bucket table 34, $BT_L$, includes buckets 22b for receiving tuples $T_L$ of table L.

Each pair of buckets 22, $B_C$ of $BT_C$ and $B_L$ of $BT_L$, which correspond to the same partition of the node 50 is known as bucket pair, $B_{CL}$. $B_{Cj}$ is the $j^{th}$ bucket $B_C$ in the bucket table $BT_C$. Likewise, $B_{Lj}$ is the $j^{th}$ bucket $B_L$ in the bucket table $BT_L$. Accordingly, $B_{CLj}$ is the $j^{th}$ bucket pair including buckets $B_{Cj}$ and $B_{Lj}$, as depicted in FIG. 9.

Figure 9:
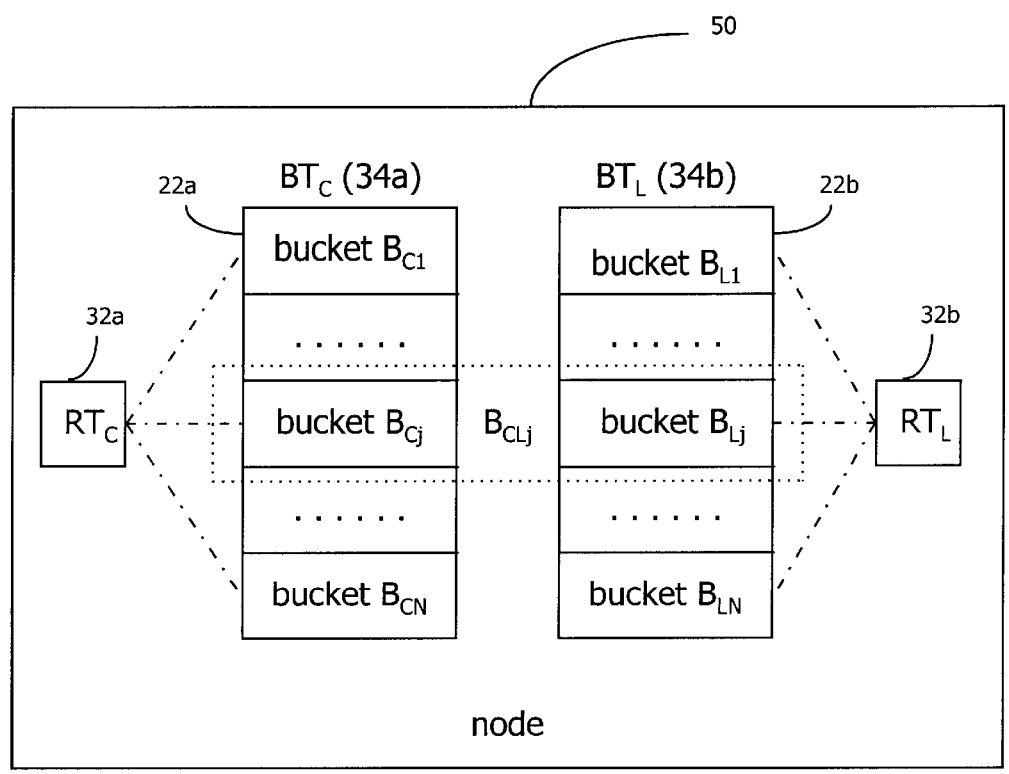
FIG. 9 is a diagram of two data structures used by a node in performing spatial join operations according to one embodiment of the invention.

The R-tree, $RT_C$ and the R-tree, $RT_L$, are shown in FIG. 9 as part of the node 50. In one embodiment, each bucket $B_C$ and $B_L$ are maintained in stable storage 70 on the node 50. The R-trees $RT_C$ and $RC_L$, however, are maintained in the memory 60. A spatial join method and apparatus according to some embodiments uses both the R-trees 32 and the bucket table 34 data structures.

In one embodiment, a spatial join operation is performed at each node 50 in three stages. The spatial join operation is performed as tuples $T_C$ and $T_L$ are received into the node 50 as a result of the universe 200 being partitioned.

First Stage: In Memory Redistribution Phase

During the first stage, tuples 10, $T_C$ and $T_L$, are received, or redistributed, into the node 50, as depicted in FIG. 5B. Accordingly, the first stage is known as a redistribution phase. Tuples $T_C$ are received into the R-tree $RT_C$. Likewise, tuples $T_L$ are received into the R-tree $RT_L$.

Upon being received into an R-tree 32, each tuple $T_C$ ($T_L$) is joined with the tuples $T_L$ ($T_C$) in the R-tree $RT_L$ ($RT_C$). This operation is illustrated in FIG. 10, according to one embodiment. As long as enough memory 60 is available in the node 50, the R-trees 32, $RT_C$ and $RT_L$, will continue to grow. However, each table may include a very large number of tuples 10. Thus, at some point, additional memory 60 for growing the R-trees 32 may be unavailable. Where additional memory is unavailable, the node 50 enters the second stage.

Second Stage: Memory Overflow Redistribution Phase

In the second stage, tuples 10, $T_C$ and $T_L$, may still be entering the node 50 from redistribution. However, no more memory 60 is available to expand the two R-trees $RT_L$ and $RT_C$. Accordingly, in one embodiment, tuples $T_C$ received into the node 50 are joined with tuples $T_L$ in the R-tree $RT_L$ without first being stored in the R-tree $RT_C$, as in the first stage. Likewise, tuples $T_L$ received into the node 50 are joined with tuples $T_C$ in the R-tree $RT_C$ without first being stored in the R-tree $RT_L$. These operations are depicted in FIG. 11A.

Also in the second stage, incoming tuples $T_C$ and $T_L$ are stored in buckets $B_C$ and $B_L$, respectively, according to the spatial partitioning performed inside the node 50. Recall that each bucket $B_C$ corresponds to a different partition within the node 50. Incoming tuple $T_C$ may belong to more than one partition following this internal partitioning strategy. Accordingly, during the second stage, the tuple $T_C$ is stored in the buckets $B_C$ associated with each partition that overlaps with the MBR 24 of the spatial join attribute value of the tuple $T_C$. Likewise, the tuple $T_L$ is stored in the buckets $B_L$ associated with each partition that overlaps with the MBR 24 of the spatial join attribute value of the tuple $T_L$.

In FIG. 11B, for example, $T_C$ is stored in bucket $B_{Cx}$, bucket $B_{Cy}$, and bucket $B_{Cz}$. Buckets $B_{Cx}$, $B_{Cy}$ and $B_{Cz}$ may or may not be adjacent to one another in the bucket table $BT_C$. Likewise, incoming tuple $T_L$ is stored in buckets $B_{Lf}$, $B_{Lg}$, and $B_{Lh}$, as depicted in FIG. 11B.

Thus, the second stage, characterized by memory overflow of one of the R-trees 32, includes a join of the incoming tuple $T_C$ ($T_L$) with the tuples in the R-tree $RT_L$ ($RT_C$). Following the spatial join, the tuple $T_C$ ($T_L$) is stored in one or more buckets $B_C$ ($B_L$), according to the internal spatial partitioning of the node 50.

Third Stage: Disk Reread Phase

In one embodiment, the third stage occurs only after all the tuples $T_C$ and $T_L$ have arrived from redistribution to the node 50. R-trees $RT_C$ and $RT_L$ are released from the memory 60, as they are no longer needed. At this point, for a bucket pair $B_{CL}$, all tuples in $B_L$ ($B_C$) have been joined with the tuples $T_C$ ($T_L$) in the R-tree $RT_C$ ($RT_L$). To join the remaining unjoined tuples 10 in the stable storage 70 (now stored in buckets $B_L$ and $B_C$), the tuples $T_C$ in $B_C$ are joined with the tuples $T_L$ in $B_L$.

Figure 12:
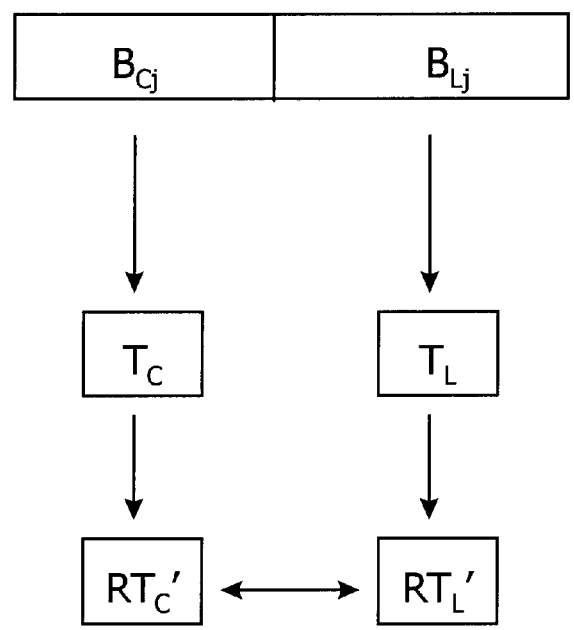
FIG. 12 is a diagram illustrating a third stage of the spatial join operation according to one embodiment of the invention.

In one embodiment, bucket pairs $B_{CLj}$ are randomly and non-repetitively selected. For each bucket pair $B_{CLj}$, two new R-trees $RT_C'$ and $RT_L'$ are initialized in the memory 60, as shown in FIG. 12. Recall that the original R-trees $RT_C$ and $RT_L$ were released from the memory 60 upon entering the third stage. Thus, enough memory 60 should be available for the new R-trees $RT_C'$ and $RT_L'$.

The tuples 10 in the bucket $B_C$ and the bucket $B_L$ of bucket pair $B_{CL}$ are read from the stable storage 70 into the memory 60 simultaneously. At the same time, for each tuple $T_C$, $T_C$ is inserted into the R-tree $RT_C'$ and joined with the tuples $T_L$ in $RT_L'$. For each tuple $T_L$, $T_L$ is inserted into the R-tree $RT_L'$ and joined with the tuples $T_C$ in $RT_C'$. In this manner, the join operations are performed for the tuples in the bucket pair. After a bucket pair is done, R-trees $RT_C'$ and $RT_L'$ are released from the memory 60, as they are no longer needed.

In the third stage, each bucket pair $B_{CL}$ is retrieved at random. This insures that the spatial join operation may be performed in a non-blocking manner.

Duplicate Avoidance Techniques

In the non-blocking parallel spatial join algorithm described above, the join result tuple of a specific $T_C$ and $T_L$ may be generated multiple times. These duplicates may arise in two ways. First, if both $T_C$ and $T_L$ are replicated at several nodes 50 during redistribution, duplicate join result tuples will be generated at the nodes 50 where both $T_C$ and $T_L$ are replicated. Secondly, within a particular node 50, if both $T_C$ and $T_L$ are replicated at several bucket pairs $B_{CL}$ at the second and third stages of the spatial join algorithm, duplicates are generated at the bucket pairs $B_{CL}$ where both $T_C$ and $T_L$ are replicated.

To insure that the spatial join algorithm is non-blocking and thus may be used for on-line data visualization, for example, the generation of duplicates is avoided rather than using a duplicate removal operator at the last step of the algorithm. This insures that intermediate results are valid, i.e., they proceed toward the final result.

In one embodiment, each tuple $T_C$ ($T_L$) is associated with the sequence numbers of the nodes 50 where it is replicated. This may be performed with a bitmap, for example. For each pair of tuples $T_C$ and $T_L$, if both are replicated at several nodes 50, the spatial join operation is performed only at one of the several nodes where both of them are replicated. To let each node 50 have a roughly equal workload, a set element selection algorithm is used to select the "winning" node 50 to perform the spatial join operation.

In one embodiment, bitmaps $BM_C$ and $BM_L$ are associated with tuples $T_C$ and $T_L$, respectively. In bitmap $BM_C$ ($BM_L$), bit N is set if tuple $T_C$ ($T_L$) is replicated at node N. Bitmaps $BM_C$ and $BM_L$ are depicted in FIG. 13, according to one embodiment. Bitmap $BM_{CL}$ is the bit-wise AND of $BM_C$ and $BM_L$. The bits set in $BM_{CL}$ represent the nodes 50 where both $T_C$ and $T_L$ are replicated. In this example, there are a total of 16 nodes 50, denoted 0–15. $T_C$ is replicated at nodes 2, 3, 5, 7, 9, 10, 13, and 14, and $T_L$ is replicated at nodes 1, 3, 5, 7, 9, 11, 12, 13, and 15.

The bit-wise AND $BM_{CL}$ of $BM_C$ and $BM_L$ is also depicted in FIG. 13. In this example, five nodes, node 3, node 5, node 7, node 9, and node 13 both received tuples $T_C$ and $T_L$. According to one embodiment, a mid-element of these nodes 50, e.g., node 7, is selected. The number 7 is used as the seed of a random number generator to generate a random number R. The number of bits set in the bitmap $BM_{CL}$ is used as mod operator Q. In one embodiment, the node 50 in which the spatial join operation is performed is selected using the formula:

$$\text{Selected Node} = (R \text{ MOD } Q)^{th} \text{ node}$$

of all nodes where both tuples $T_C$ and $T_L$ are replicated. Thus, $T_C$ and $T_L$ are joined at the selected node 50 of the 16 available nodes. In other words, only one node 50 performs the spatial join operation between tuples $T_C$ and $T_L$, even though those tuples are replicated at multiple nodes. Thus, where tuples $T_C$ or $T_L$ are replicated at several nodes 50, this set element selection technique is employed to avoid duplicates.

At a specific node, tuples $T_C$ and $T_L$ may also be replicated at several bucket pairs $B_{CL}$. To avoid duplicate calculation of spatial join operations for a given tuple pair, in one embodiment, at the second and third stages of the spatial join algorithm, each tuple $T_C$ ($T_L$) is associated with the sequence numbers of the bucket pairs where it is replicated. This may be done using another bitmap. For each pair of tuples $T_C$ and $T_L$, if both are replicated at several bucket pairs $B_{CL}$, in one embodiment, the tuples 10 are joined at the bucket pair with the smallest sequence number. Other algorithms for selecting the bucket pair for performing the join operation may be similarly employed.

In one embodiment, the spatial join algorithm may be adjusted where the data is very skewed (e.g., one node 50 does more than the average work), or the data sets are very large. In such instances, some bucket pairs may not fit entirely into the memory 60 at the third stage of the algorithm. Thus, in one embodiment, the number of bucket pairs, $B_{CL}$, is increased at the beginning of the spatial join operation.

In a second embodiment, the third stage of the spatial join algorithm is modified such that, for each bucket pair that cannot fit in the memory 60, the tuples 10 in the bucket pair are treated as if they had just come from redistribution. The spatial join operation is then performed recursively.

The operations described above may be performed by the software 40, as shown in FIG. 1. Instructions of the software 40 are stored in the stable storage 70, but may be loaded into the memory 60 and executed by the processor 30. Operation of the software 40 according to one embodiment is depicted in the flow diagram of FIG. 8, above. More generally, as used here, a "controller" refers to the software 40 or the processor 30, or a combination of both. Also, "controller" can refer to either a single software or hardware component or to plural software or hardware components.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:

storing first tuples in a first table in a system;

storing second tuples in a second table in the system;

partitioning the first and second tuples into plural portions;

wherein partitioning the first and second tuples comprises redistributing the first and second tuples among plural nodes of the system;

performing a spatial join of the first and second tuples to create join result tuples based on the partitioned portions and using spatial attributes of the first and second tuples; and performing duplicate avoidance to avoid generating duplicate join result tuples; and wherein performing duplicate avoidance comprises identifying a pair of a first tuple and a second tuple that is replicated on plural nodes, and selecting one of the plural nodes to perform the spatial join of the pair of the first tuple and the second tuple, wherein the spatial join of the pair of the first tuple and second tuple is not performed on the plural nodes other than the selected node.

2. The method of claim 1, wherein selecting one of the plural nodes to perform the spatial join of the pair comprises:

selecting based on generating a random number.

3. The method of claim 1, wherein redistributing the first and second tuples among plural nodes of the system comprises:

receiving first and second tuples in a memory.

4. The method of claim 3, wherein receiving the first and second tuples in a memory comprises:

receiving the first tuples into a first spatial index.

5. The method of claim 4, wherein receiving the first and second tuples in a memory further comprises:

receiving the second tuples into a second spatial index.

6. The method of claim 5, wherein joining the first and second tuples comprises:

joining first tuples from the first spatial index with second tuples in the second spatial index.

7. The method of claim 6, wherein the first spatial index and second spatial index reside in the memory, and wherein joining the first and second tuples further comprises:

determining that the memory is full;

in response to determining that the memory is full, joining first tuples not received in the first spatial index with second tuples in the second spatial index; and storing the first tuples not received in the first spatial index in a first data structure defined in a stable storage of the system.

8. The method of claim 7, further comprising:

in response to determining that the memory is full, joining second tuples not received in the second spatial index with first tuples in the first spatial index; and storing the second tuples not received in the second spatial index in the a second data structure.

9. The method of claim 8, wherein the first data structure comprises first buckets to store first tuples and the second data structure comprises second buckets to store second tuples.

10. The method of claim 9, wherein joining the first and second tuples further comprises:

retrieving a pair of first and second buckets at random from plural bucket pairs;

building a third spatial index comprising the first tuples;

building a fourth spatial index comprising the second tuples; and joining the first and second tuples in the third and fourth spatial indices.

11. The method of claim 10, further comprising wherein performing duplicate avoidance comprises:

identifying a pair of a first tuple and a second tuple that is replicated on plural nodes of the system; and selecting one of the plural nodes to perform the spatial join of the pair of the first tuple and the second tuple, wherein the spatial join of the pair of the first tuple and second tuple is not performed on the plural nodes other than the selected node.

12. The method of claim 11, wherein performing duplicate avoidance further comprises:

identifying a pair of a first tuple and a second tuple in which the first tuple is replicated in plural first buckets and the second tuple is replicated in plural second buckets; and selecting one pair of plural bucket pairs containing the first tuple and the second tuple to perform the spatial join.

13. The method of claim 1, further comprising:

retrieving a result once a spatial join between any two tuples is performed.

14. The method of claim 1, performing a spatial join of the first and second tuples comprising:

performing a non-blocking spatial join.

15. A system comprising:

a processor;

a storage; and instructions executable by the processor, for enabling the system to:

store first tuples in a first table accessible by plural nodes in the system;

store second tuples in a second table accessible by the plural nodes;

redistribute the first and second tuples across the plural nodes;

at each node, subdivide received redistributed tuples into plural buckets; and perform a spatial join operation between the first tuples and the second tuples based on the redistributing and subdividing and using spatial attributes of the first and second tuples; and wherein the instructions executable by the processor, further enable the system to: generate join result tuples from the spatial join: and perform duplicate avoidance to avoid generating duplicate join result tuples by:

identifying a pair of a first tuple and a second tuple that is replicated on plural nodes; and selecting one of the plural nodes to perform the spatial join of the pair of the first tuple and the second tuple, wherein the spatial join of the pair of the first tuple and second tuple is not performed on the plural nodes other than the selected node.

16. The system of claim 15, wherein the instructions executable by the processor further enable the system to:

at each node, receive the redistributed first tuples into a first spatial index;

at each node, receive the redistributed second tuples into a second spatial index; and at each node, join first tuples from the first spatial index with second tuples in the second spatial index.

17. The system of claim 16, further comprising a non-persistent storage and a stable storage, wherein the first and second spatial indices are stored in the non-persistent storage, and wherein the instructions executable by the processor further enable the system to:

determine that the non-persistent storage is full;

in response to determining that the non-persistent storage is full, join first tuples not received in the first spatial index with second tuples in the second spatial index; and store the first tuples not received in the first spatial index in the buckets structure defined in the stable storage.

18. An article comprising a medium storing instructions for enabling a processor-based, system that has non-persistent storage and persistent storage to:

store first tuples in a first table in a system;

store second tuples in a second table in the system;

redistribute the first and second tuples across plural nodes of the system; and perform a spatial join of the redistributed first and second tuples using spatial attributes of the first and second tuples;

wherein performing the spatial join comprises performing the spatial join in plural stages, the plural stages including at least a first stage in which the spatial join is performed on redistributed first and second tuples stored in non-persistent storage, and a second stage after the non-persistent storage has become full, wherein performing the spatial join in the second storage comprises performing the spatial join on first and second tuples stored in persistent storage; and wherein further storing instructions for enabling a processor-based system to:

identifying a pair of a first tuple and a second tuple that is replicated on plural nodes; and selecting one of the plural nodes to perform the spatial join of the pair of the first tuple and the second tuple, wherein the spatial join of the pair of the first tuple and second tuple is not performed on the plural nodes other than the selected node.

19. The article of claim 18, further storing instructions for enabling a processor-based system to:

select based on generating a random number.

20. The article of claim 18, further storing instructions for enabling a processor-based system to:

receive first and second tuples in the non-persistent storage.

21. The article of claim 20, further storing instructions for enabling a processor-based system to:

receive the first tuples into a first spatial index.

22. The article of claim 21, further storing instructions for enabling a processor-based system to:

receive the second tuples into a second spatial index.

23. The article of claim 22, further storing instructions for enabling a processor-based system to:

join first tuples from the first spatial index with second tuples in the second spatial index.

24. The article of claim 23, further storing instructions for enabling a processor-based system to:

determine that the first spatial index is full;

in response to determining that the first spatial index is full, join first tuples not received in the first spatial index with second tuples in the second spatial index; and store the first tuples not received in the first spatial index in a data structure defined in a stable storage of the system.

25. The article of claim 24, further storing instructions for enabling a processor-based system to:

join second tuples not received in the second spatial index with first tuples in the first spatial index; and store the second tuples not received in the second spatial index in the data structure.

26. The article of claim 25, further storing instructions for enabling a processor-based system to:

store first tuples not received in the first spatial index in first buckets; and store second tuples not received in the second spatial index in second buckets, wherein the data structure comprises the first buckets and the second buckets.

27. The article of claim 26, further storing instructions for enabling a processor-based system to:

retrieve a pair of first and second buckets at random from plural bucket pairs;

build a third spatial index comprising the first tuples;

build a fourth spatial index comprising the second tuples; and join the first and second tuples in the third and fourth spatial indices.

28. The article of claim 27, further storing instructions for enabling a processor-based system to:

identify a pair of a first tuple and a second tuple that is replicated on plural nodes of the system; and select one of the plural nodes to perform the spatial join of the pair of the first tuple and the second tuple.

29. The article of claim 28, further storing instructions for enabling a processor-based system to:

identify a pair of a first tuple and a second tuple in which the first tuple is replicated in plural first buckets and the second tuple is replicated in plural second buckets; and select one pair of plural bucket pairs containing the first tuple and the second tuple to perform the spatial join.

30. A system comprising:

a plurality of nodes;

a storage containing first tuples and second tuples; and a controller adapted to partition the first and second tuples among the plurality of nodes, the controller adapted to further identify a pair of a first tuple and a second tuple that is replicated on multiple nodes, and to select one of the multiple nodes to perform a join of the pair of the first tuple and the second tuple; and wherein the controller is adapted to perform a spatial join of the pair of the first tuple and the second tuple using spatial attributes of the first and second tuples; and wherein the storage is divided into plural portions accessible by corresponding nodes.

31. An article comprising at least one storage medium containing instructions that, when executed, cause a system to:

partition first tuples of a first table and second tuples of a second table among plural nodes of the system;

during the partitioning, receive, in each node, first tuples into a first spatial index and second tuples into a second spatial index, the first and second spatial indices stored in a non persistent memory;

perform a spatial join of the first and second tuples from the first and second spatial indices during the partitioning;

determine that the non-persistent memory is overflowing; and in response to determining that the non-persistent memory is overflowing, perform a spatial join of first tuples not received in the first spatial index with second tuples from the second spatial index; and wherein the instructions, when executed, cause the system to further: identify a pair of a first tuple and a second tuple that is replicated on multiple nodes: and to select one of the multiple nodes to perform the spatial join of the pair of the first tuple and the second tuple, wherein the spatial join of the pair of the first tuple and second tuple is not performed on nodes other than the selected node.

32. The article of claim 31, wherein the instructions, when executed, cause the system to further:

partition, in each node, first and second tuples among plural buckets when overflow of the non-persistent memory occurs.

33. The article of claim 32, wherein the instructions, when executed, cause the system to further:

store the plural buckets in stable storage.

34. The article of claim 33, wherein the instructions, when executed, cause the system to further:

store, in each node, the first tuples in first buckets and second tuples in second buckets in response to the non-persistent memory overflowing; and perform the spatial join of the tuples in pairs of the first and second buckets.

35. The article of claim 18, wherein the non-persistent storage is to store first and second indices containing respective redistributed first and second tuples, and wherein performing the spatial join in the first stage comprises performing the spatial join of first and second tuples from the first and second indices.

36. The article of claim 35, wherein the first and second indices comprise first and second R-tree indices.

37. The article of claim 35, wherein performing the spatial join in plural stages comprises performing the spatial join in a third stage in which redistributed first tuples are not received in the first index, but the redistributed first tuples not received in the first index are spatially joined with the second tuples in the second index, wherein the third stage occurs before the second stage.

* * * * *

UNITED STATES PATENT AND TRADEMARK OFFICE
CERTIFICATE OF CORRECTION

| | |
|---|---|
| PATENT NO. | : 6,732,107 B1 |
| DATED | : May 4, 2004 |
| INVENTOR(S) | : Luo, G., Ellman, C. and Naughton, J. |

It is certified that error appears in the above-identified patent and that said Letters Patent is hereby corrected as shown below:

Column 9,
Line 56, after "in" delete "the".

Column 10,
Line 6, delete "further comprising".

Signed and Sealed this

Twenty-eighth Day of February, 2006

JON W. DUDAS
*Director of the United States Patent and Trademark Office*